(12) United States Patent
Sonokawa et al.

(10) Patent No.: US 10,655,487 B2
(45) Date of Patent: May 19, 2020

(54) PRESSURE BALANCED SECONDARY SEAL

(71) Applicant: United Technologies Corporation, Farmington, CT (US)

(72) Inventors: Masayoshi Sonokawa, West Hartford, CT (US); Rachel A. McGrath, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 59 days.

(21) Appl. No.: 15/897,748

(22) Filed: Feb. 15, 2018

(65) Prior Publication Data
US 2019/0249559 A1 Aug. 15, 2019

(51) Int. Cl.
| | |
|---|---|
| *F01D 11/12* | (2006.01) |
| *F01D 11/14* | (2006.01) |
| *F16J 15/34* | (2006.01) |
| *F01D 11/00* | (2006.01) |
| *F16J 15/16* | (2006.01) |
| *F16J 15/00* | (2006.01) |
| *F16J 15/44* | (2006.01) |
| *F02C 7/28* | (2006.01) |

(52) U.S. Cl.
CPC .............. *F01D 11/003* (2013.01); *F02C 7/28* (2013.01); *F16J 15/002* (2013.01); *F16J 15/164* (2013.01); *F16J 15/344* (2013.01); *F16J 15/3452* (2013.01); *F16J 15/3464* (2013.01); *F16J 15/441* (2013.01); *F05D 2240/55* (2013.01); *F05D 2240/58* (2013.01)

(58) Field of Classification Search
CPC ...... F01D 11/003; F16J 15/002; F16J 15/164; F16J 15/3452; F16J 15/3464; F05D 2240/55

USPC ......................................................... 277/379
See application file for complete search history.

(56) References Cited

U.S. PATENT DOCUMENTS

| | | | |
|---|---|---|---|
| 6,467,774 B1 | 10/2002 | Amaral et al. | |
| 8,967,627 B2 | 3/2015 | Jahn et al. | |
| 9,316,119 B2 | 4/2016 | Sonokawa | |
| 9,683,451 B2 | 6/2017 | Sonokawa et al. | |
| 9,726,031 B2 * | 8/2017 | Cusack ............... | F16J 15/3284 |

(Continued)

OTHER PUBLICATIONS

EP search report for EP18212789.4 dated Jul. 9, 2019.

*Primary Examiner* — Gilbert Y Lee
(74) *Attorney, Agent, or Firm* — Getz Balich LLC (57) ABSTRACT

An annular stator seal support extends radially between a radial inner support side and a radial outer support side. A secondary seal includes a first radially extending secondary seal sidewall surface, a second radially extending secondary seal sidewall surface and a third radially extending secondary seal sidewall surface. An annular stator sleeve support includes a channel radially distal the radial inner support side, the channel includes a first radially extending channel sidewall and a second radially extending channel sidewall located axially forward of the first radially extending channel sidewall, and a third radially extending channel sidewall located axially behind the first radially extending channel sidewall. The first radially extending seal sidewall surface contacts the first radially extending channel sidewall, and the second radially extending channel sidewall is axially spaced from the second radially extending secondary seal sidewall surface.

20 Claims, 6 Drawing Sheets

(56) References Cited

U.S. PATENT DOCUMENTS

| | | | |
|---|---|---|---|
| 2007/0096399 A1* | 5/2007 | Miller | F01D 11/00 |
| | | | 277/377 |
| 2009/0121441 A1 | 5/2009 | Miller et al. | |
| 2013/0069313 A1* | 3/2013 | Sonokawa | F01D 11/003 |
| | | | 277/300 |
| 2014/0091535 A1* | 4/2014 | Cusack | F16J 15/3284 |
| | | | 277/641 |
| 2015/0337674 A1* | 11/2015 | Sonokawa | F01D 11/003 |
| | | | 415/173.3 |
| 2016/0208923 A1 | 7/2016 | Miller | |
| 2018/0340436 A1 | 11/2018 | Miller | |

* cited by examiner

PRESSURE BALANCED SECONDARY SEAL

STATEMENT REGARDING FEDERALLY SPONSORED RESEARCH OR DEVELOPMENTS

This invention was made with government support under contract number FA8626-16-C-2139 awarded by the United States Air Force. The government has certain rights in the invention.

BACKGROUND OF THE INVENTION

1. Technical Field

The present disclosure relates generally to rotational equipment and, more particularly, to a pressure balanced secondary seal assembly that cooperates with a main/face seal.

2. Background Information

Seal assemblies may be used in rotational equipment to provide a seal between regions of high and low fluid pressure and/or temperature. Seal assemblies may be used, for example, to provide an air and/or liquid seal between a stator and a rotor of a turbine engine, a pump, a compressor, a turbine of, for example, a hydro-electric generator, as well as various other rotational equipment.

U.S. Pat. Nos. 9,683,451 and 9,316,119, each assigned to the assignee of the present invention, disclose a gas turbine engine that includes a main seal and a secondary seal. U.S. Pat. Nos. 9,683,451 and 9,316,119 are hereby incorporated by reference.

There is a need for an improved secondary seal assembly that is pressure balanced.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gas turbine engine ring seal assembly. The gas turbine engine ring seal assembly may comprise an annular stator seal support that extends radially between a radial inner support side and a radial outer support side. The gas turbine engine ring seal assembly may also comprise an annular stator seal housing that extends radially between a radial inner housing side and a radial outer housing side. The gas turbine engine ring seal assembly may further comprise a seal housing that includes an annular housing sleeve and a housing flange, where the housing sleeve is arranged at an inner housing side and extends axially between a first housing end and a second housing end and includes a first axially extending housing sleeve surface. An annular stator seal element may include a first stator seal axially extending surface radially adjacent to the first axially extending housing sleeve surface and a second stator seal axially extending surface. A secondary seal may include an axially extending distal radial surface that contacts the second stator seal axially extending surface, a proximate radial surface, a first radially extending secondary seal sidewall surface, a second radially extending secondary seal sidewall surface and a third radially extending secondary seal sidewall surface, where the annular stator seal support includes a channel radially distal the radial inner support side. The channel may include a first radially extending channel sidewall and second radially extending channel sidewall located axially forward of the first radially extending channel sidewall, and a third radially extending channel sidewall located axially behind the first radially extending channel sidewall. The first radially extending secondary seal sidewall surface may contact the first radially extending channel sidewall. The second radially extending channel sidewall may be axially spaced from the second radially extending secondary seal sidewall surface.

The secondary seal may comprise a first transition surface that transitions between the first radially extending secondary seal sidewall surface and the second radially extending secondary seal sidewall surface.

The secondary seal may comprise a second transition surface that transitions between the third radially extending secondary seal sidewall surface and a fourth radially extending secondary seal sidewall surface.

The secondary seal may comprise a third transition surface that transitions between the second stator seal axially extending surface and the axially extending distal radial surface.

The secondary seal may comprise an axially extending intermediate radial surface spaced from the second stator seal axially extending surface.

The secondary seal may comprise a proximate radial surface that is in radially spaced relationship with a base surface of the channel.

The gas turbine engine ring seal assembly may also comprise a plurality of springs that are arranged circumferentially around an axial centerline on the engine, and extend axially between the seal support and the annular stator seal housing.

The first transition surface may comprise a first curved surface.

The second transition surface may comprise a second curved surface.

According to another aspect of the present disclosure a gas turbine engine ring seal assembly that circumscribes an axial centerline is provided. The gas turbine engine ring seal assembly may comprise an annular stator seal support that extends radially between a radial inner support side and a radial outer support side. The gas turbine engine ring seal assembly may comprise an annular stator seal housing that extends radially between a radial inner housing side and a radial outer housing side. The gas turbine engine ring seal assembly may also comprise a seal housing that includes an annular housing sleeve and a housing flange, where the housing sleeve is arranged at an inner housing side and extends axially between a first housing end and a second housing end and includes a first axially extending housing sleeve surface. The gas turbine engine ring seal assembly may further comprise an annular stator seal element that includes a first stator seal axially extending surface radially adjacent to the first axially extending housing sleeve surface and a second stator seal axially extending surface. A secondary seal may include an axially extending distal radial surface that contacts the second stator seal axially extending surface, a proximate radial surface, a first radially extending secondary seal sidewall surface, a second radially extending secondary seal sidewall surface and a third radially extending secondary seal sidewall surface, where the annular stator seal support includes a channel radially distal the radial inner support side. The channel includes a first radially extending channel sidewall and second radially extending channel sidewall located axially forward of the first radially extending channel sidewall, and a third radially extending channel sidewall located axially behind the first radially extending channel sidewall. The first radially extending secondary seal sidewall surface contacts the first radially extending channel sidewall, and the second radially extending channel sidewall is axially spaced from the second radially extending secondary seal sidewall surface.

A plurality of springs may be arranged circumferentially around the axial centerline and extend axially between the annular stator seal support and the annular stator seal housing.

The secondary seal may comprise a first curved surface that transitions between the first radially extending secondary seal sidewall surface and the second radially extending secondary seal sidewall surface.

The secondary seal may comprise a second curved surface that transitions between the third radially extending secondary seal sidewall surface and a fourth radially extending secondary seal sidewall surface.

The secondary seal may comprise a third curved surface that transitions between the second stator seal axially extending surface and the axially extending distal radial surface.

The secondary seal may comprise an axially extending intermediate radial surface spaced from the second stator seal axially extending surface.

The secondary seal may comprise a proximate radial surface that is in radially spaced relationship with a base surface of the channel.

The gas turbine engine ring seal assembly may further comprise a plurality of springs that are arranged circumferentially around an axial centerline on the engine, and extend axially between the seal support and the annular stator seal housing.

The secondary seal comprises a first transition surface that transitions between the first radially extending secondary seal sidewall surface and the second radially extending secondary seal sidewall surface.

The secondary seal may comprise a second transition surface that transitions between the third radially extending secondary seal sidewall surface and a fourth radially extending secondary seal sidewall surface.

The secondary seal may comprise a third transition surface that transitions between the second stator seal axially extending surface and the axially extending distal radial surface.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

Figure 1:
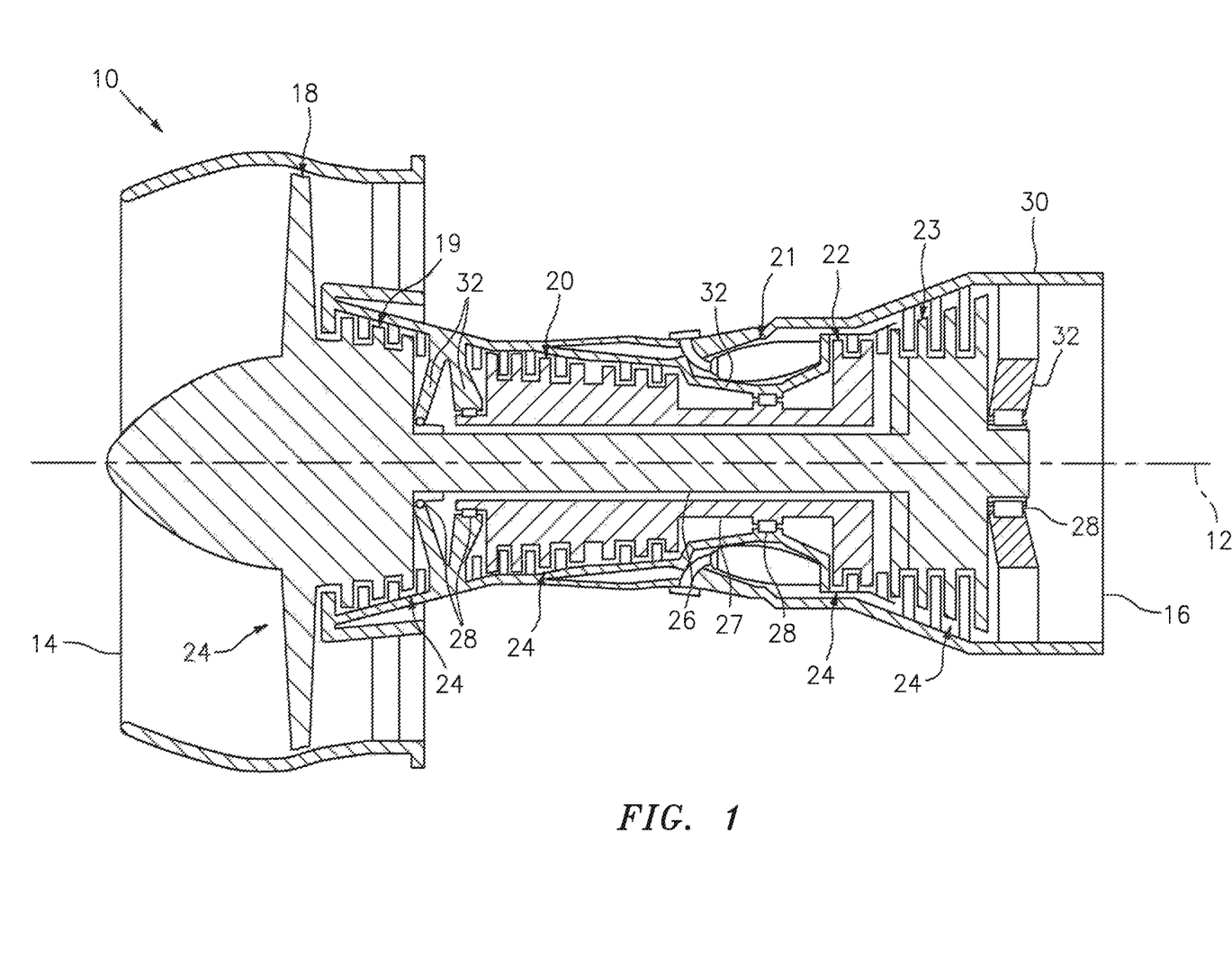
FIG. 1 is a sectional illustration of a turbine engine.

FIG. 1 illustrates a turbine engine 10 that extends along an axial centerline 12 between a forward airflow inlet 14 and an aft airflow exhaust 16. The engine 10 includes a plurality of engine sections such as, for example, a fan section 18, low and high pressure compressor sections 19 and 20, a combustor section 21, and high and low pressure turbine sections 22 and 23. Each of the engine sections 18-20, 22 and 23 includes a rotor assembly, which includes one or more rotor stages 24.

Each of the rotor stages 24 includes a plurality of rotor blades arranged circumferentially around and connected to a rotor disk. The rotor stages 24 of the engine sections 18, 19 and 23 may be connected to a first (e.g., low speed) shaft 26. The rotor stages 24 of the engine sections 20 and 22 may be connected to a second (e.g., high speed) shaft 27. The first and the second shafts 26 and 27 are rotatably supported by a plurality of bearings 28. Each of the bearings 28 is connected to an engine case 30 by at least one stator 32 such as, for example, an annular support strut.

Figure 2:
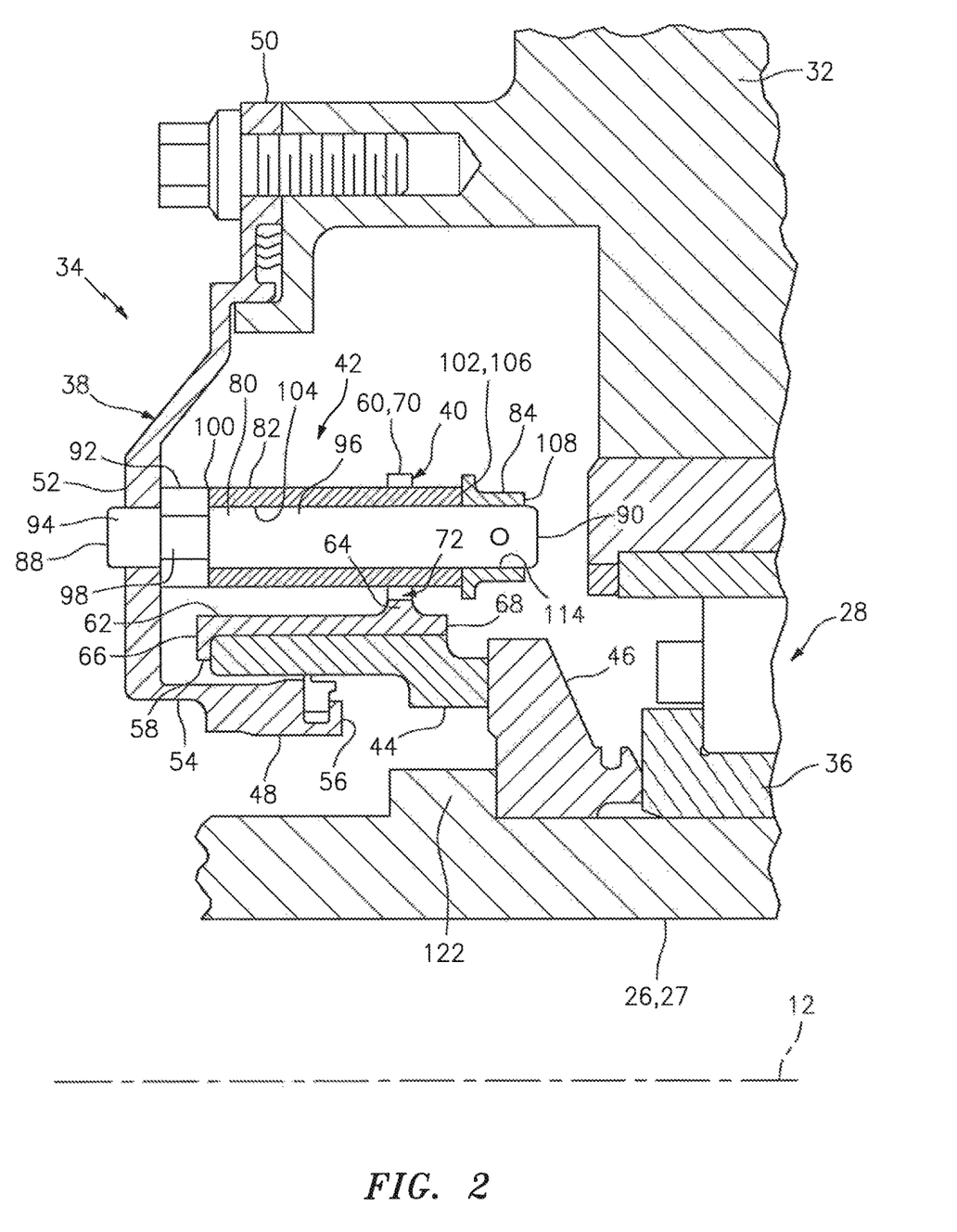
FIG. 2 is a partial sectional illustration of a seal assembly for the engine of FIG. 1 at a first circumferential location.
Figure 3:
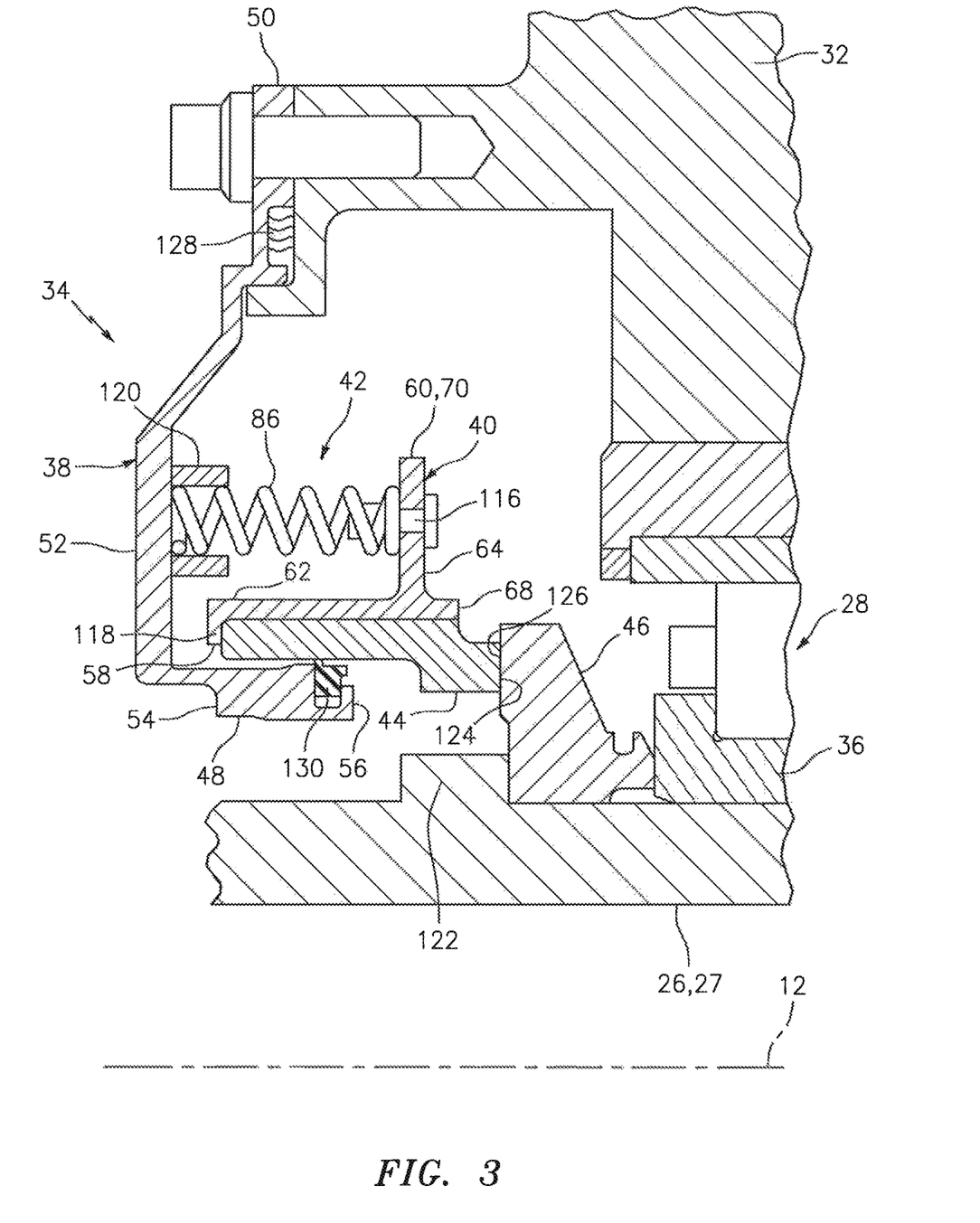
FIG. 3 is a partial sectional illustration of the seal assembly at a second circumferential location.

FIGS. 2 and 3 illustrate a seal assembly 34 for sealing a gap between one of the stators 32 and a rotor 46 such as, for example, an annular seal element. The seal assembly 34 includes an annular stator seal support 38, an annular stator seal housing 40, a housing support assembly 42, an annular stator seal element 44 (e.g., a carbon face seal), and an annular rotor seal element 46 (e.g., a face seal landing).

The seal support 38 extends radially between a radial inner support side 48 and a radial outer support side 50. The seal support 38 embodiment of FIGS. 2 and 3 includes an annular first support segment 52 and an annular second support segment 54. The first support segment 52 extends radially from the second support segment 54 to the outer support side 50. The second support segment 54 is arranged at (e.g., adjacent or proximate to) the inner support side 48. The second support segment 54 extends axially from the first support segment 52 to a distal segment end 56.

Figure 4:
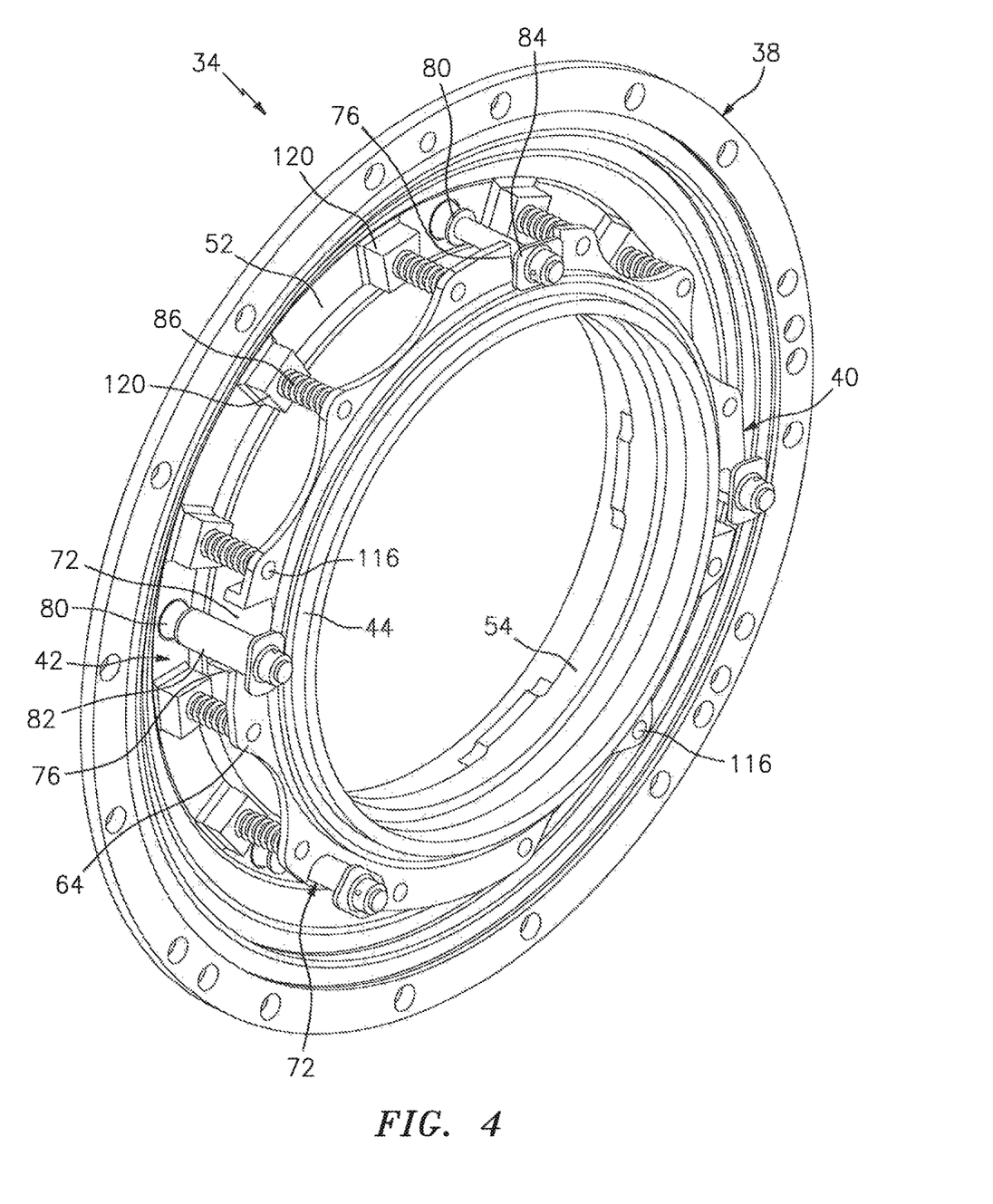
FIG. 4 is a perspective illustration of a portion of the seal assembly of FIG. 2.

The seal housing 40 extends radially between a radial inner housing side 58 and a radial outer housing side 60. The seal housing 40 embodiment of FIGS. 2 and 3 includes an annular housing sleeve 62 and a (e.g., segmented annular) housing flange 64. The housing sleeve 62 is arranged at the inner housing side 58. The housing sleeve 62 extends axially between a first housing end 66 and a second housing end 68. The housing flange 64 is arranged at the second housing side 68. The housing flange 64 extends radially out from the housing sleeve 62 to a distal flange end 70, for example, at the outer housing side 60. Referring to FIG. 4, the housing flange 64 includes, for example, a plurality of slots 72 arranged circumferentially around the centerline. The slots 72 extend axially through the housing flange 64. Each of the slots 72 may extend radially into the housing flange 64 from the distal flange end 70 to a slot end 74. Each of the slots 72 extends laterally (e.g., circumferentially or tangentially) between opposing slot sides, which defines a respective lateral slot width therebetween.

Referring to FIG. 4, the housing support assembly 42 includes a plurality of torque pins 80, a plurality of guide sleeves 82, a plurality of stopper collars 84, and a plurality of springs 86 (e.g., coil springs). Referring to FIG. 2, each of the torque pins 80 extends axially between a first pin end 88 and a second pin end 90. The torque pin 80 embodiment of FIG. 2 includes an intermediate segment 92 arranged axially between a (e.g., threaded) first end segment 94 and a (e.g., non-threaded) second end segment 96. The intermediate segment 92 may include one or more torqueing features 98 such as, for example, a plurality of flats arranged circumferentially around the segment 92 to receive a drive head of a wrench or a ratchet. The first end segment 94 extends axially from the intermediate segment 92 to the first pin end 88. The second end segment 96 extends axially from the intermediate segment 92 to the second pin end 90.

Each of the guide sleeves 82 extends axially between a first sleeve end 100 and a second sleeve end 102. Each of the guide sleeves 82 includes a bore 104 that extends axially through the sleeve 82 between the first and the second sleeve ends 100 and 102.

Each of the stopper collars 84 extends axially between a first collar end 106 and a second collar end 108. Referring to FIG. 2, the bore 114 extends axially into (e.g., through) the collar 84 from the first collar end 106 towards (e.g., to) the second collar end 108.

Referring to FIG. 4, the torque pins 80 and the springs 86 are arranged circumferentially around the centerline. One or more of the springs 86 may be respectively interposed between adjacent torque pins 80. Referring now to FIG. 2, the torque pins 80 are connected to the first support segment 52. The first end segment 94 of each of the torque pins 80, for example, is mated with (e.g., threaded into) a respective (e.g., threaded) aperture in the first support segment 52. The intermediate segment 92 of each of the torque pins 80 may engage (e.g., contact) the first support segment 52. The second end segments 96 of a plurality of the torque pins 80 are respectively mated with (e.g., extend into or through) the bores 104 of the guide sleeves 82. Each of the second end segments 96 is mated with the bore 114 of a respective one of the stopper collars 84. Each of the stopper collars 84 is connected to the torque pin 80, for example, at the respective second pin end 90 with a fastener (e.g., a cotter pin). Referring to FIG. 3, each of the springs 86 is (e.g., removably) connected to the seal housing 40. An end of each of the springs 86, for example, is mated with (e.g., slid onto) a respective mounting nub 116, which is connected (e.g., riveted or otherwise fastened) to the housing flange 64.

The stator seal element 44 is connected to the seal housing 40. The stator seal element 44, for example, is mated with (e.g., seated and/or press fit within) the housing sleeve 62 and abutted against a retainer flange 118 at the first housing end 58. Referring to FIG. 4, the seal housing 40 is removably connected to the seal support 38. The seal housing 40 and the stator seal element 44, for example, are axially mated with (e.g., slid onto) the second support segment 54. Free ends of the springs 86 may be respectively mated with spring seats 120 on the first support segment 52. The seal housing 40 is twisted about the centerline, for example, until the guides sleeves 82 laterally engage the slot sides 76. In this configuration, a portion of each of the stopper collars 84 may laterally overhang a respective portion of the housing flange 64 adjacent the respective slot side 76. The stopper collars 84 therefore may axially engage and retain the seal housing 40 where, for example, the springs 86 push the seal housing 40 axially away from the seal support 38.

Referring to FIG. 3, the rotor seal element 46 is mounted onto the shaft 26, 27, for example, axially between a shaft shoulder 122 and the rotor 36. The first support segment 52 is connected to the stator 32 with, for example, a plurality of fasteners (e.g., bolts). The springs 86 push the seal housing 40 axially away from the seal support 38 and, thus, bias the stator seal element 44 axially against the rotor seal element 46. A radial seal surface 124 of the stator seal element 44, for example, axially engages a radial seal surface 126 of the rotor seal element 46, thereby forming a rotary gas and/or liquid seal therebetween.

An annular secondary seal element 130 may be arranged radially between the second support segment 54 and the stator seal element 44 to reduce or prevent fluid leakage therebetween.

Figure 5:
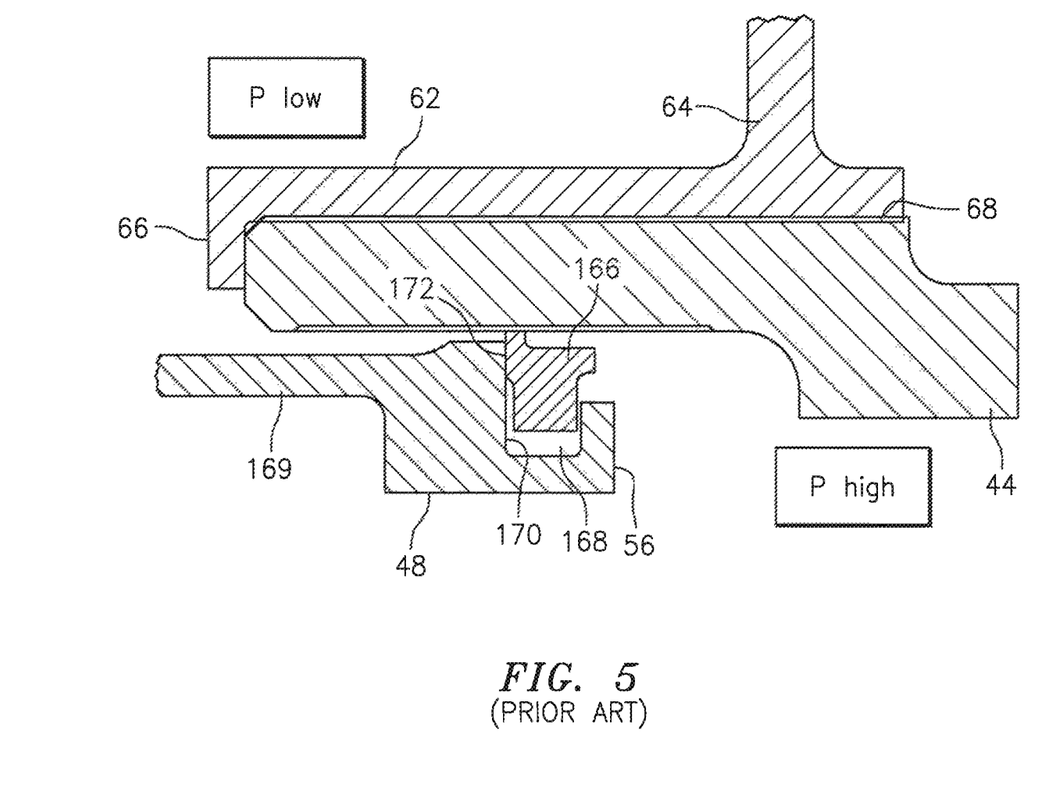
FIG. 5 is a partial sectional illustration of a prior art secondary seal assembly.

FIG. 5 illustrates a prior art secondary seal assembly 166 located in a channel 168 of the annular stator seal support 169. In this prior art embodiment the channel 168 includes a radially extending sidewall 170, a radially distal portion of which contacts a radially extending sidewall 172 of the secondary seal assembly 166. This configuration leads to a pressure imbalance between $P_{low}$ and $P_{high}$.

Figure 6:
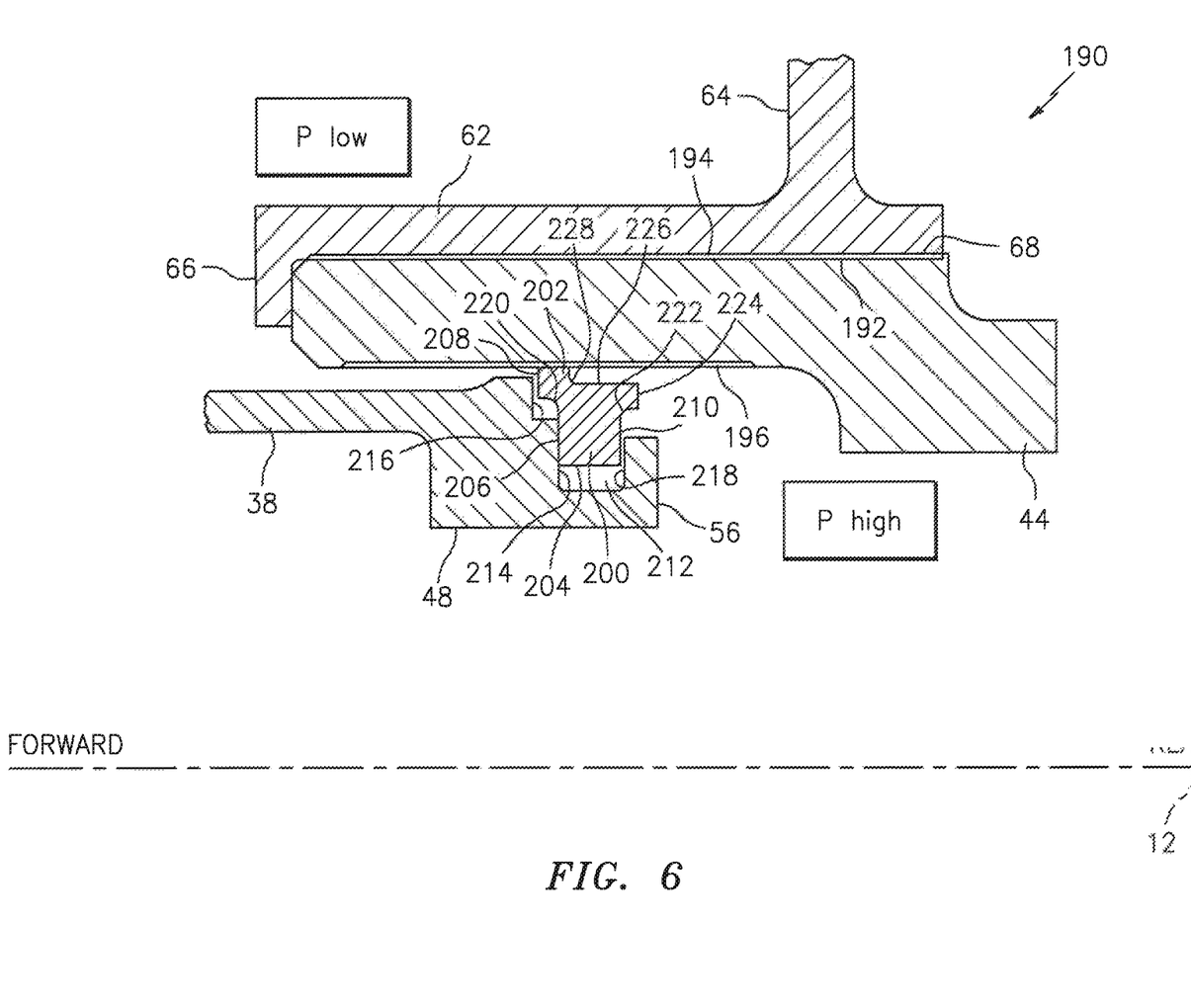
FIG. 6 is a partial sectional illustration of an improved secondary seal assembly.

FIG. 6 is a partial sectional illustration of an exemplary embodiment of a secondary seal assembly 190. The secondary seal assembly 190 includes the annular stator seal support 38 that extends radially between the radial inner support side 48 and the radial outer support side 50 (FIGS. 2-3). The annular stator seal element 44 (e.g., a carbon face seal) includes a first stator seal axially extending surface 192 that is radially adjacent to first axially extending housing sleeve surface 194, and a second stator seal axially extending surface 196. A secondary seal 200 includes an axially extending distal radial surface 202 that contacts the second stator seal axially extending surface 196, a proximate radial surface 204, a first radially extending secondary seal sidewall surface 206, a second radially extending secondary seal sidewall surface 208 and a third radially extending secondary seal sidewall surface 210.

The annular stator seal sleeve support 38 includes channel 212 radially distal/outside the radial inner support side 48, the channel 212 includes a first radially extending sidewall 214 and a second radially extending sidewall 216 axially forward of the first radially extending sidewall, and a third radially extending sidewall 218 axially downstream of the first radially extending sidewall 214 with respect to the axial centerline 12.

The first radially extending seal sidewall surface 206 contacts the second radially extending sidewall 214, and the second radially extending sidewall 216 is axially spaced from the second radially extending secondary seal sidewall surface 208. A first transition surface 220 (e.g., a curved surface) transitions between the first radially extending secondary seal sidewall surface 206 and the second radially extending secondary seal sidewall surface 208. A second transition surface 222 (e.g., a curved surface) transitions between the third radially extending secondary seal sidewall surface 210 and a fourth radially extending secondary seal sidewall surface 224.

The secondary seal 200 may also include an axially extending intermediate radial surface 226 that is spaced from the second stator seal axially extending surface 196. A third transition surface 228 (e.g., a curved surface) may transition between the axially extending distal radial surface 202 and the axially extending intermediate radial surface 226.

The axial gap between the second radially extending secondary seal sidewall surface 208 and the second radially extending sidewall 216 allows the pressure $P_{low}$ to be established adjacent to the first transitions surface 220. The non-zero distance of the axial gap between the second radially extending secondary seal sidewall surface 208 and the second radially extending sidewall 216 helps to provide a pressure balance of the secondary seal 200. The pressure at surface 202 varies from $P_{high}$ to $P_{low}$, the pressure at surfaces 226 and 228 is $P_{high}$, the pressure at surface 220 is $P_{low}$ and the pressure at surface 204 and 222 is $P_{high}$.

In some embodiments, the turbine engine 10 may include a plurality of the seal assemblies 34. In this manner, one or more turbine engine rotors may each be arranged axially between a respective pair of the seal assemblies 34.

A person of skill in the art will recognize the seal assembly may include various seal element types and configurations other than those described above and illustrated in the drawings. The present invention therefore is not limited to any particular stator and/or rotor seal element types or configurations.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine ring seal assembly, comprising:
    an annular stator seal support that extends radially between a radial inner support side and a radial outer support side;
    an annular stator seal housing that extends radially between a radial inner housing side and a radial outer housing side, the seal housing includes an annular housing sleeve and a housing flange, where the housing sleeve is arranged at an inner housing side and extends axially between a first housing end and a second housing end and includes a first axially extending housing sleeve surface;
    an annular stator seal element that includes a first stator seal axially extending surface radially adjacent to the first axially extending housing sleeve surface and a second stator seal axially extending surface;
    a secondary seal that includes a axially extending distal radial surface that contacts the second stator seal axially extending surface, a proximate radial surface, a first radially extending secondary seal sidewall surface, a second radially extending secondary seal sidewall surface and a third radially extending secondary seal sidewall surface;
    where the annular stator seal support includes a channel radially distal the radial inner support side, the channel includes a first radially extending channel sidewall and second radially extending channel sidewall located axially forward of the first radially extending channel sidewall, and a third radially extending channel sidewall located axially behind the first radially extending channel sidewall,
    where the first radially extending secondary seal sidewall surface contacts the first radially extending channel sidewall, and the second radially extending channel sidewall is axially spaced from the second radially extending secondary seal sidewall surface that is radially closer to the second stator seal axially extending surface than the first radially extending secondary seal sidewall surface.

2. The gas turbine engine ring seal assembly of claim 1, where the secondary seal comprises a first transition surface that transitions between the first radially extending secondary seal sidewall surface and the second radially extending secondary seal sidewall surface.

3. The gas turbine engine ring seal assembly of claim 2, where the secondary seal comprises a second transition surface that transitions between the third radially extending secondary seal sidewall surface and a fourth radially extending secondary seal sidewall surface.

4. The gas turbine engine ring seal assembly of claim 3, where the secondary seal comprises a third transition surface that transitions between the second stator seal axially extending surface and an axially extending intermediate radial surface.

5. The gas turbine engine ring seal assembly of claim 4, where the secondary seal comprises a proximate radial surface that is in radially spaced relationship with a base surface of the channel.

6. The gas turbine engine ring seal assembly of claim 3, where the secondary seal comprises an axially extending intermediate radial surface spaced from the second stator seal axially extending surface.

7. The gas turbine engine seal assembly of claim 3, where the second transition surface comprises a second curved surface.

8. The gas turbine engine seal assembly of claim 2, where the first transition surface comprises a first curved surface.

9. The gas turbine engine ring seal assembly of claim 1, further comprising a plurality of springs that are arranged circumferentially around an axial centerline on the engine, and extend axially between the seal support and the annular stator seal housing.

10. A gas turbine engine ring seal assembly that circumscribes an axial centerline, comprising:
    an annular stator seal support that extends radially between a radial inner support side and a radial outer support side;
    an annular stator seal housing that extends radially between a radial inner housing side and a radial outer housing side, the seal housing that includes an annular housing sleeve and a housing flange, where the housing sleeve is arranged at an inner housing side and extends axially between a first housing end and a second housing end and includes a first axially extending housing sleeve surface;
    an annular stator seal element that includes a first stator seal axially extending surface radially adjacent to the first axially extending housing sleeve surface and a second stator seal axially extending surface;
    a secondary seal that includes a axially extending distal radial surface that contacts the second stator seal axially extending surface, a proximate radial surface, a first radially extending secondary seal sidewall surface, a second radially extending secondary seal sidewall surface and a third radially extending secondary seal sidewall surface;

where the annular stator seal support includes a channel radially distal the radial inner support side, the channel includes a first radially extending channel sidewall and second radially extending channel sidewall located axially forward of the first radially extending channel sidewall, and a third radially extending channel sidewall located axially behind the first radially extending channel sidewall, where the first radially extending secondary seal sidewall surface contacts the first radially extending channel sidewall, and the second radially extending channel sidewall is axially spaced from the second radially extending secondary seal sidewall surface that is radially closer to the second stator seal axially extending surface than the first radially extending secondary seal sidewall surface.

11. The gas turbine engine ring seal assembly of claim 10, where a plurality of springs are arranged circumferentially around the axial centerline and extend axially between the annular stator seal support and the annular stator seal housing.

12. The gas turbine engine ring seal assembly of claim 10, where the secondary seal comprises a first curved surface that transitions between the first radially extending secondary seal sidewall surface and the second radially extending secondary seal sidewall surface.

13. The gas turbine engine ring seal assembly of claim 10, where the secondary seal comprises a second curved surface that transitions between the third radially extending secondary seal sidewall surface and a fourth radially extending secondary seal sidewall surface.

14. The gas turbine engine ring seal assembly of claim 10, where the secondary seal comprises a third curved surface that transitions between the second stator seal axially extending surface and an axially extending intermediate radial surface.

15. The gas turbine engine ring seal assembly of claim 10, where the secondary seal comprises an axially extending intermediate radial surface spaced from the second stator seal axially extending surface.

16. The gas turbine engine ring seal assembly of claim 10, where the secondary seal comprises a proximate radial surface that is in radially spaced relationship with a base surface of the channel.

17. The gas turbine engine ring seal assembly of claim 10, further comprising a plurality of springs that are arranged circumferentially around an axial centerline on the engine, and extend axially between the seal support and the annular stator seal housing.

18. The gas turbine engine ring seal assembly of claim 10, where the secondary seal comprises a first transition surface that transitions between the first radially extending secondary seal sidewall surface and the second radially extending secondary seal sidewall surface.

19. The gas turbine engine ring seal assembly of claim 10, where the secondary seal comprises a second transition surface that transitions between the third radially extending secondary seal sidewall surface and a fourth radially extending secondary seal sidewall surface.

20. The gas turbine engine ring seal assembly of claim 10, where the secondary seal comprises a third transition surface that transitions between the second stator seal axially extending surface and the axially extending distal radial surface.

* * * * *